W. A. LURIE.
DENTAL FORCEPS.
APPLICATION FILED AUG. 10, 1920.
1,380,726.
Patented June 7, 1921.
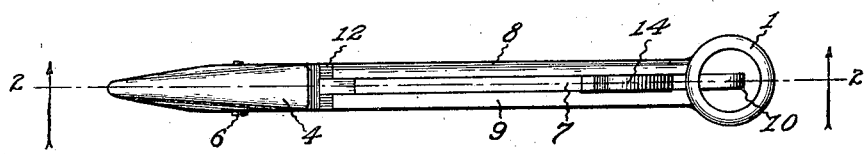
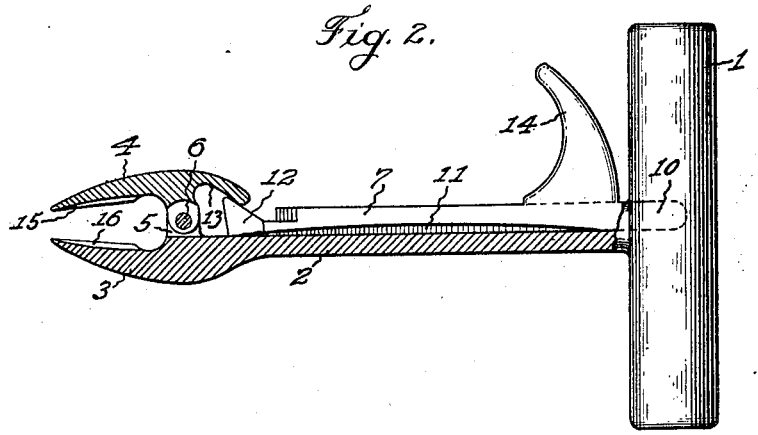
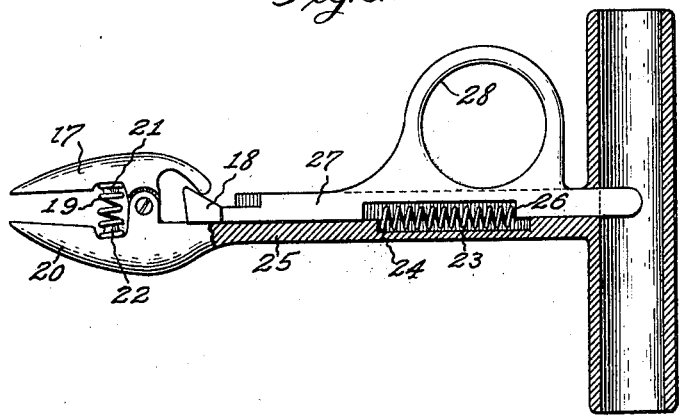
Inventor:
William A. Lurie,
By Geo. S. Pines
his Atty

UNITED STATES PATENT OFFICE.

WILLIAM A. LURIE, OF NEW ORLEANS, LOUISIANA.

DENTAL FORCEPS.

1,380,726.  Specification of Letters Patent.  Patented June 7, 1921.

Application filed August 10, 1920. Serial No. 402,535.

*To all whom it may concern:*

Be it known that I, WILLIAM A. LURIE, a citizen of the United States, residing in New Orleans, parish of Orleans, and State of Louisiana, have invented a new and useful Improvement in Dental Forceps, of which the following is a specification.

My invention relates to dental tools and is particularly directed to an improved forceps for extracting teeth.

The object of the present invention is to provide a dental forceps having greater operating convenience and adaptability than dental forceps heretofore known.

A limitation characteristic of heretofore types of dental forceps has been that the operator has been obliged to use considerable strength and force in gripping the tooth to be extracted while also exerting force to extract the tooth primarily. Again, it has been necessary by reason of the general design and scheme of such forceps to operate upon the patient from over the head in many cases in order to get the proper leverage to extract the tooth while maintaining a proper grip upon the tooth being extracted.

The forceps of the present invention provide for a suitable gripping pressure of the jaws thereof so the tooth to be extracted will be securely held after once gripped, with the minimum exertion of force on the part of the operator, leaving the operator's strength and his attention for the careful and positive task of drawing the tooth, rather than divided largely in retaining the forceps-hold on the tooth.

Further, the forceps of the present invention has for an object to be more conveniently applied and the operator can adapt himself to a more convenient and advantageous operating position with respect to the patient than has been possible heretofore.

In the accompanying drawings Figure 1 shows an edge plan view of the forceps of one form of the invention; Fig. 2 is a side part sectional view thereof at section line 2—2 shown in Fig. 1; Fig. 3 is a side part sectional view of a modification of the forceps shown in Figs. 1 and 2.

The forceps comprise a tubular handle 1 attached to a stem 2 carrying at its outer end a forceps jaw 3 as a part thereof. A coöperating forceps jaw 4 which is movably mounted on a double pivotal projection 5 forms a part of the stem and jaw 3. The 4 is pivotally attached to and between the elements of said 5, held and hinged by a screw 6 passing through one member of the double pivotal projection 5, the threads of the screw 6 registering with the tapped hole in the companion pivotal projection. The movable, pivoted jaw 4 is thus adapted to move freely in a plane with the stem within proper limits to engage the tooth to be extracted between the jaw 3 and the jaw 4.

The member 7 is slidably attached to member 2 between the channel sides 8 and 9, and retained from free upward movement at the right hand end by reason of the slider 10 registering with a hole extending into the handle 1. The member 7 is concaved laterally and longitudinally, as indicated by the shaded portion 11, to reduce friction of member 7 sliding upon the bottom of the groove in the stem 2 between the flanges or channel sides 8 and 9 formed out of the stem, by milling, for instance.

At the left hand end of the member 7 is a wedge-shaped projection 12 adapted to coöperate with an angular under surface 13 of the movable jaw 4. While the jaw 4 in the position shown in Fig. 2 may rotate about the screw 6 to the left the wedge-shaped projection 12 retains it from moving to the right. It is thus clear that if the member 7 is drawn toward the handle 1 by the operator gripping said handle and passing the first finger, for example, around the rear of the finger projection, which forms a part of member 7, to the left thereof and to the front thereof and exerting a force to draw the member 7 toward the handle 1 the action of the wedge-shaped projection 12 will be to raise the right hand end of the jaw 4 and cause the left or gripping end of the jaw 4 to clamp a tooth engaged between the said 4 and the fixed jaw 3 with a force greatly increased from that applied by the finger to the projection 14 by reason of the wedge-leverage action of the projection 12 under the right hand projection of jaw 4. The member 7 being slidable the pressure exerted to a tooth seized between the jaws of the forceps as described may be removed and the jaws allowed to open freely by removing the pressure applied to the finger projection 14 and freely sliding the member 7 to the left.

The jaws 3 and 4 are concave-shaped on the inner seizing surface as shown at 15 and 16 to improve the gripping action of the jaws on the tooth to be extracted. However, shaping the jaws of dental forceps thus is not new, as applied to well known forms wherein the jaws are clamped by lever-action applied directly to the jaw-handles.

The shape of the jaws 3 and 4 may be modified widely, in fact, in practice there would be many forms of jaws used, each adapted, perhaps, in shape and form to engage the various teeth, depending upon the shape thereof and their position in the mouth. Of course, the application of the present invention is not limited to the use in extracting teeth of humans.

Fig. 3 is a modification of the present invention constructed on generally similar lines to the forceps shown in Figs. 1 and 2. However, to make the jaw 17 automatically open incident to the wedge-shaped projection 18 (corresponding to 12 in Figs. 1 and 2) being moved to the left from the position shown, a compression spring 19 is set between the said jaw 17 and the fixed jaw 20, retained by studs 21 and 22 projecting from the inner sides of the jaws and extending inside the coils of the spring 19 to retain it in position. Further, a tension spring 23 is introduced attached between shoulder 24 of the stem member 25 and shoulder 26 of the slidable member 27 (corresponding to 7 in Figs. 1 and 2). The spring 23 is thus in a recessed portion cut or formed from the stem member 25 and the slidable member 27. In lieu of a finger projection (as 14 in Figs. 1 and 2) a finger-hold 28 is provided, enabling a more secure hold to be applied to retain the member 27 in its applied position, clamping the jaws 17 and 20 over the tooth to be extracted. Of course, this adaptation may be readily applied to the forceps shown in Figs. 1 and 2, in place of the projection 14.

Modifications, such as making the handle 1 longer, or larger, or of milled finish and generally adapted to fit the hand of the operator more readily may be made without departing from the scope of the present invention. Also, the material for the various elements of the forceps may be varied widely though steel for the various parts would ordinarily be the best suited to its uses.

Having thus described my invention, what I claim and desire to cover by United States Letters Patent is:—

1. In a dental forceps a pivoted jaw coöperating with a fixed jaw, and an independent finger-controlled reciprocating member operable to control the pivoted jaw.

2. In a forceps for extracting teeth a jaw adapted to coöperate with a fixed jaw for clamping a tooth between said jaws, and a means including a sliding member and an attached wedge-shaped member, the latter directly controlling the movable jaw coöperative with the fixed jaws.

3. In a forceps for gripping teeth and the like an independent pivoted jaw adapted to coöperate with a fixed jaw for gripping an object held between the said jaws, a spring for holding the jaws apart normally, and a finger-controlled member coöperating with the movable jaw for causing the said movable jaw to grip the object held between the said jaws.

4. In a forceps for gripping teeth and the like an independent pivoted jaw which coöperates with a fixed jaw for gripping an object held between the said jaws, a spring for holding the jaws apart normally, a finger controlled member coöperating with the movable jaw for causing the said movable jaw to grip the object held between the jaws, and means for automatically restoring the finger-controlled member to normal position when the control force is removed.

5. In a forceps two jaws of which one is movable and the other of which is secured fixed to a stem, a handle secured crosswise of the stem at the end opposite the jaw, a finger-controlled member mounted slidably along the stem, and a wedge-shaped member attached to the said sliding member for controlling the pivoted jaw whereby an object may be clamped between the said jaws.

6. In a forceps for extracting teeth, jaws which coöperate for clamping a finger-controlled tooth between said jaws, and means including a reciprocating member for applying pressure from the jaws to a tooth held beween the jaws.

In witness whereof, I hereunto subscribe my name this 3rd day of August, A. D. 1920.

WILLIAM A. LURIE.